United States Patent [19]

Siebenga

[11] Patent Number: 5,507,612

[45] Date of Patent: Apr. 16, 1996

[54] LARGE BALE HANDLING APPARATUS

[76] Inventor: Charles Siebenga, 211 - 8th St. #2, Belgrade, Mont. 59714

[21] Appl. No.: 404,375

[22] Filed: Mar. 15, 1995

Related U.S. Application Data

[63] Continuation-in-part of Ser. No. 988,296, Dec. 8, 1992, Pat. No. 5,397,208, which is a continuation-in-part of Ser. No. 557,128, Jul. 23, 1990, Pat. No. 5,211,345, which is a continuation of Ser. No. 166,656, Mar. 11, 1988, abandoned.

[51] Int. Cl.$^6$ ........................................ B60P 1/50
[52] U.S. Cl. ........................ 414/111; 414/554; 414/555; 414/556
[58] Field of Search ................................... 414/24.5, 24.6, 414/111, 551, 554, 555, 556, 789.2, 789.3, 789.7

[56] References Cited

U.S. PATENT DOCUMENTS 4,259,034  3/1981  Ward et al. ........................ 414/24.6
4,952,111  8/1990  Callahan ........................ 414/789.7 X

*Primary Examiner*—Michael S. Huppert
*Assistant Examiner*—Janice L. Krizek
*Attorney, Agent, or Firm*—Waters & Morse

[57] ABSTRACT

Apparatus for picking up and stacking large bales of hay or the like comprises a wheeled trailer that is pulled in an offset position by a tractor, a bale pick up and loading mechanism on the front of the trailer for picking up the bales as the trailer is pulled across a field, and a downwardly and a rearwardly inclined accumulating platform on the trailer for storing the bales. The accumulating platform is tiltable in a rearward direction to unload the bales in a stack. The bale pick-up and loading mechanism comprises a pivotal loading platform with outwardly extending pick-up arms on the sides of the loading platform guiding and manipulating the bales into proper position and for grasping the ends of the bales as they are lifted on the accumulating platform. Upwardly extending gripping members or sliding alignment tubes at the ends of the pick-up arms, and pivotable grab hooks, provide increased bale grasping capabilities and improved stacking stability.

7 Claims, 10 Drawing Sheets

LARGE BALE HANDLING APPARATUS

CROSS-REFERENCE TO RELATED APPLICATION

The present application is a continuation-in-part of Applicant's co-pending patent application Ser. No. 07/988,296, filed Dec. 8, 1992, now U.S. Pat. No. 5,397,208, issued Mar. 14, 1995, and entitled LARGE BALE HANDLING APPARATUS, which is a continuation-in-part of patent application Ser. No. 07/557,128, filed Jul. 23, 1990, now U.S. Pat. No. 5,211,345, which is a continuation of patent application Ser. No. 07/166,656, filed Mar. 11, 1988, now abandoned.

BACKGROUND OF THE INVENTION

The present invention relates to loading and stacking apparatus for handling large bales of hay or the like and more particularly to a bale loading and stacking apparatus incorporating an improved bale pick-up mechanism.

In harvesting crops such as hay, the current practice is to utilize mobile baling devices which collect the hay and form it into bales. The bales are discharged to the ground as they are formed. Wagons or trucks or the like are then driven over the field and the individual bales are loaded thereon for transportation to a place of storage or utilization.

It is common practice to form the hay in large rectangular bales of different sizes (depending on the baler used). Typical sizes are a so-called "one ton square" bale, also called a "4×4" bale, which measures 4×4×8 feet; a "3×4" one ton bale, which measures 3×4×8 feet; a 2×3×8 foot bale called a "half ton" or "2×3" bale (actually weighing about 600–700 pounds); and a 32 inch×32 inch×8 foot bale called a "half ton square" or "32×32 inch" bale. All such bales are referred to as large or big bales.

While some bale wagons are still loaded and unloaded by hand, a lifting apparatus such as a forklift truck is generally utilized to lift the bales (particularly the large bales) and to load them on the bale truck or wagon. After the bale wagon has been completely loaded, the bale wagon and forklift truck are then driven to the desired place of storage, where the forklift truck is used to unload or at least to stack the bales for storage. This is a cumbersome and time-consuming process and involves two operations.

A variety of complex accessory mechanisms have been incorporated into bale wagons to load and unload bales from bale wagons. The apparatus described in applicant's U.S. Pat. No. 4,619,570 represents one of the more effective devices, wherein a bale pick-up and stacking mechanism is incorporated into a flat bed truck. This machine provides substantial savings over conventional methods for loading bales but is somewhat difficult to operate and requires the dedication of a flat bed truck to the single purpose of loading and stacking bales.

Applicant's U.S. Pat. No. 5,211,345 (which is incorporated herein by reference) discloses a substantially improved type of bale loading mechanism wherein the bale loading mechanism is mounted on a trailer towed on an offset hitch behind a tractor. With this mechanism, a bale loading device on the front of the trailer is towed into contact with a bale so that pick-up forks extend under the bale. The loading device is then actuated to lift the bale upwardly, whereupon the bale slides rearwardly on an inclined storage bed or accumulating platform on the trailer and lodges at the rearmost position on the trailer. This operation is repeated until the accumulating platform and loading device are filled. At that point, the trailer is towed to a storage location and the bed is tipped rearwardly to deposit the bales in a stacked position at the storage location. The opposite procedure is used to unstack the bales for use.

In operating the apparatus of applicant's co-pending patent application, it was observed that it was somewhat difficult to properly align the loading device with bales in the field so that pick-up forks on the front of the loading device would slide under the bales in a centered and aligned position.

An object of the present invention is to provide an improved pick-up and loading device for bale handling machines and more particularly for the inclined bed bale handling apparatus of the type shown in applicant's copending patent application. Another object of the present invention is to provide loading apparatus for a bale handling system that is capable of picking up different sizes of large bales. Still another object is to provide a simplified hydraulic operating system for the improved loading device that is easily operated by a single action of a control valve by the tractor operator.

SUMMARY OF THE INVENTION

The present invention comprises an improved bale loading mechanism for a large bale handling apparatus of the type that comprises an offset wheeled trailer pulled by a tractor, a bale accumulating platform on the trailer, and a bale loading mechanism at the front of the apparatus that picks up and deposits the bales on the accumulating platform as the apparatus is pulled over a field. The improved bale loading mechanism comprises a loading platform pivotally mounted at an inner end thereof to the front of the accumulating platform for movement between a lowered position, wherein the loading platform extends downwardly toward the ground, and a raised position wherein the loading platform extends forwardly from the front of the platform at an upwardly inclined angle. A pair of pick-up arms are pivotally mounted on laterally opposite sides of the loading platform and extend outwardly therefrom for movement in a plane generally perpendicular to the plane of the loading platform. The pick-up arms are pivotal between a gripping position, wherein the arms are pivoted inwardly in position to grip the ends of bales positioned between the arms, and an open position, wherein the arms are pivoted in an outwardly inclined position with respect to the loading platform. When the arms are in their open positions, they serve as inclined alignment members that engage a bale that is out of orientation or alignment with the loading platform in its lowered position and move the bale into orientation and alignment with the loading platform as the apparatus is pushed forwardly against the bale. A drive mechanism raises and lowers the loading platform and opens and closes the pick up arms.

Another feature of the present invention include a grab hook mechanism for improving the pick-up capabilities of the mechanism, particularly the ability to pick up two bales at once. The present invention also includes an improved hydraulic control circuit, and has rail extensions that facilitate handling of half ton bales.

A vertically slidable alignment tube or foot at the end of each pick up arm facilitates picking up one-half ton square bales in stacks of two bales, with the upper bale being staggered forwardly from the lower bale for stable stacking of the bales on the accumulating platform.

Other features and advantages are apparent in the following description and drawings of preferred embodiments of the present invention.

BRIEF DESCRIPTION OF THE DRAWINGS

FIG. 12a is a schematic plan view showing the pick-up arms pivoted inwardly for pushing a misaligned bale into proper alignment for picking the bale up.

BRIEF DESCRIPTION OF THE PREFERRED EMBODIMENTS

Figure 1:
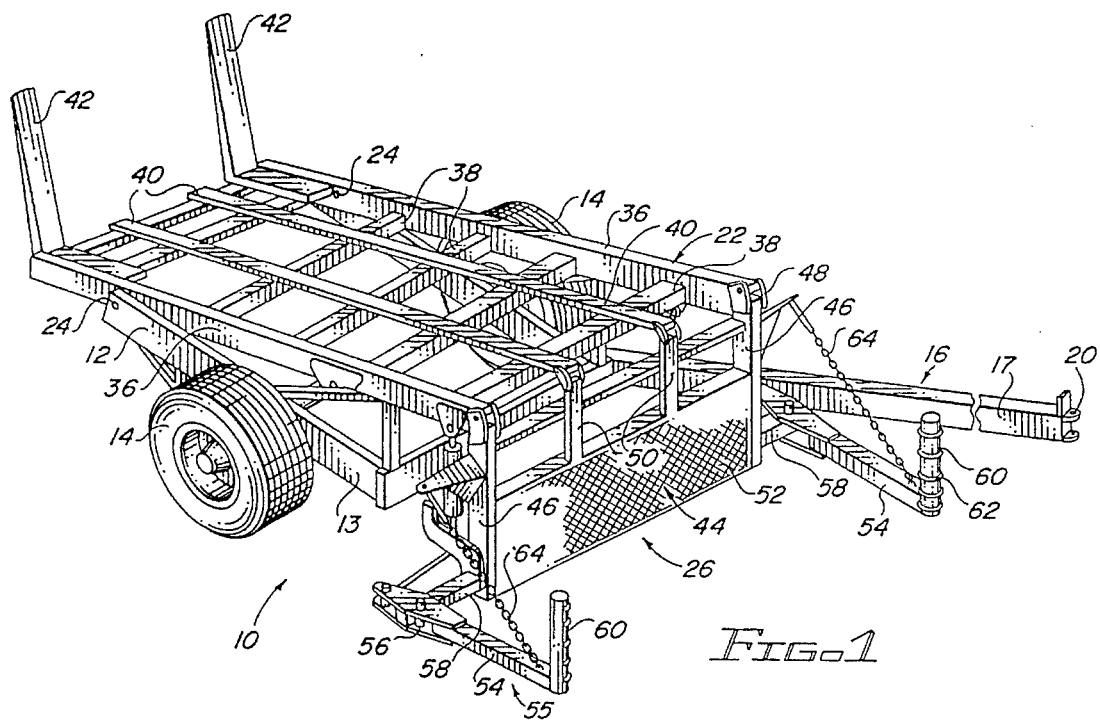
FIG. 1 is a perspective view of one embodiment of the present invention, showing the loading platform in a lowered position for picking up a large bale.
Figure 2:
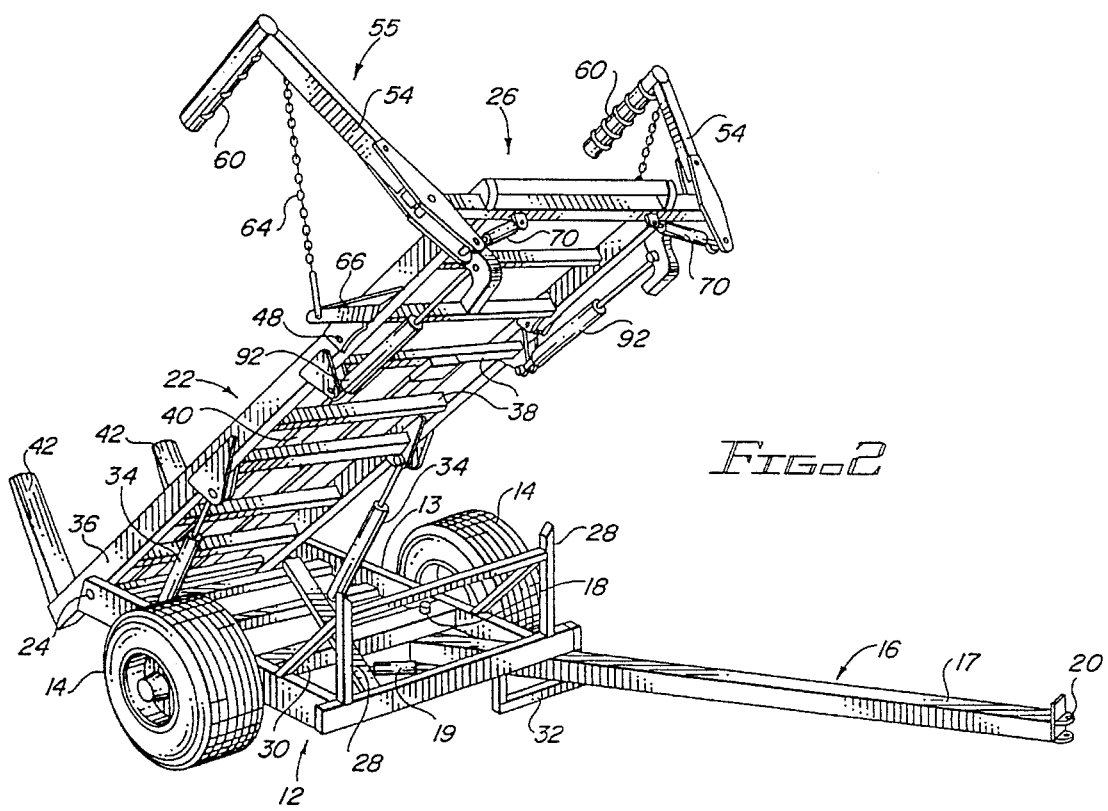
FIG. 2 is a perspective view of the present invention showing the loading platform pivoted to an upward position and showing the bed partially pivoted rearwardly in order to display the internal components of the trailer mechanism.

Referring to the drawings, large bale handling apparatus 10 of the present invention comprises a trailer 12 consisting of a frame 13 mounted on wheels 14 and connected to a tractor by means of a hitch mechanism 16 consisting of a tongue 17 pivotally mounted at an inner end 18 by pivot pin to the trailer and extending outwardly to a hitch 20 that is attached to the tractor. A bale accumulating platform or bed 22 is pivotally mounted in an inclined position on the trailer by pivot pins 24 at the rear of the trailer. A bale loading mechanism 26 is pivotally mounted at the front of bed 22 for movement between a raised position (FIG. 2) and a lowered position (FIG. 1). Bales are grasped by the loading mechanism when the loading mechanism is in the lowered position of FIG. 1 and then the bales are raised to the raised position of FIG. 2, whereupon they slide rearwardly on the inclined bed to a rear position. It should be noted that the entire bed assembly is partially tilted rearwardly in FIG. 2 in order to show the interior components of the trailer mechanism. In a loading position, the bed is lowered until the bed rests on the upper ends of posts 28 extending upwardly from the front of the frame.

The construction of the bed and trailer mechanism of the present invention is similar to the bed and trailer mechanism of applicant's co-pending patent application. Trailer 12 comprises a rectangular frame 13 with lateral cross members 30 providing support. Wheels 14 are mounted on an axle supported on the frame. Tongue 17 is mounted to one of the lateral cross members 30 by a pivot pin 18. A hydraulic hitch cylinder 19 extending between the frame and the tongue 17 of the hitch mechanism can be actuated to move the hitch mechanism from an offset position (shown in FIGS. 1 and 2) to an aligned position, shown in FIG. 9. The tongue fits through a downwardly extending channel member 32 on the underside of the front edge of the frame, which supports and constrains the outward and inward movement of tongue 17.

While the accumulating platform or bed assembly normally rests on posts 28, the entire bed assembly can be raised and pivoted rearwardly about pivot pins 24 by means of hydraulic bed cylinders 34 extending between the frame and the underside of the bed on opposite sides of the trailer.

Bed 22 comprises a pair of longitudinal side rails 36 connected by spaced lateral rails 38. A pair of longitudinally extending internal rails 40 extend the length of the bed at spaced positions between the side rails. Upwardly extending forks 42 are mounted at the rear end of the bed and serve to prevent bales from sliding off the end of the bed after they have been deposited on the bed from the front edge.

The improved pick-up and loading mechanism 26 of the present invention comprises a loading platform 44 pivotally mounted on the front edge of the bale receiving bed. The loading platform comprises longitudinal outer loader rails 46 pivotally mounted at upper ends 48 to the front ends of outer side rails 36 of the bed. Inner loader rails 50 are aligned with inner longitudinal rails 40 of the bed. A plate 52 is mounted on the outer end of the loading platform and extends between rails 46.

Figure 3:
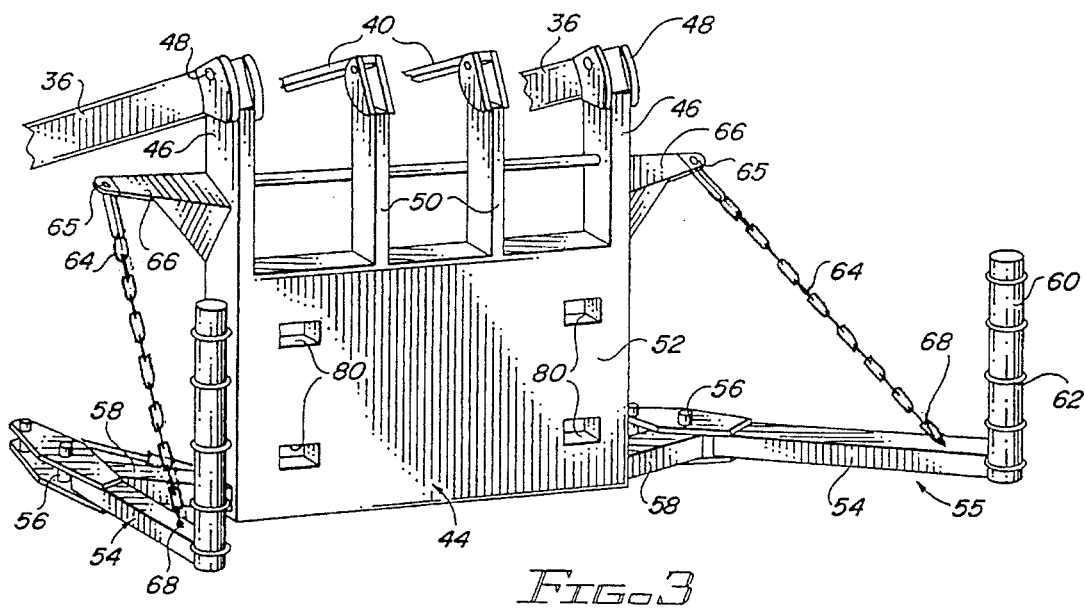
FIG. 3 is a fragmentary perspective view showing a second embodiment of a pick-up mechanism in a lowered position for picking up a bale.

Instead of the pick-up forks employed in applicant's co-pending patent application, the loading mechanism of the present invention employs pick-up mechanism 55 comprising a pair of alignment or pick-up arms 54 pivotally attached at inner ends 56 to frame members 58 that extend outwardly from the bottom or outer end of loading platform 44. Bale-grasping members 60 extend at right angles from the outer ends of pick-up arms 54 in an upward direction according to FIG. 1 orientation. Bale grasping members 60 are cylindrical arms or posts having ridges 62 around the inner edges thereof for improving the grasp on the bales. Support struts 64 are pivotally attached at inner ends 65 to brackets 66 attached to the sides of the loading platform and extend downwardly and outwardly to an outer ends 68 attached near the outer ends of pick-up arms 54. Support struts 64 can be solid members or they can be linked chains. These support and hold the pick-up arms in a generally horizontally position (FIG. 3 orientation) as the arms are pivoted inwardly and outwardly.

Figure 4:
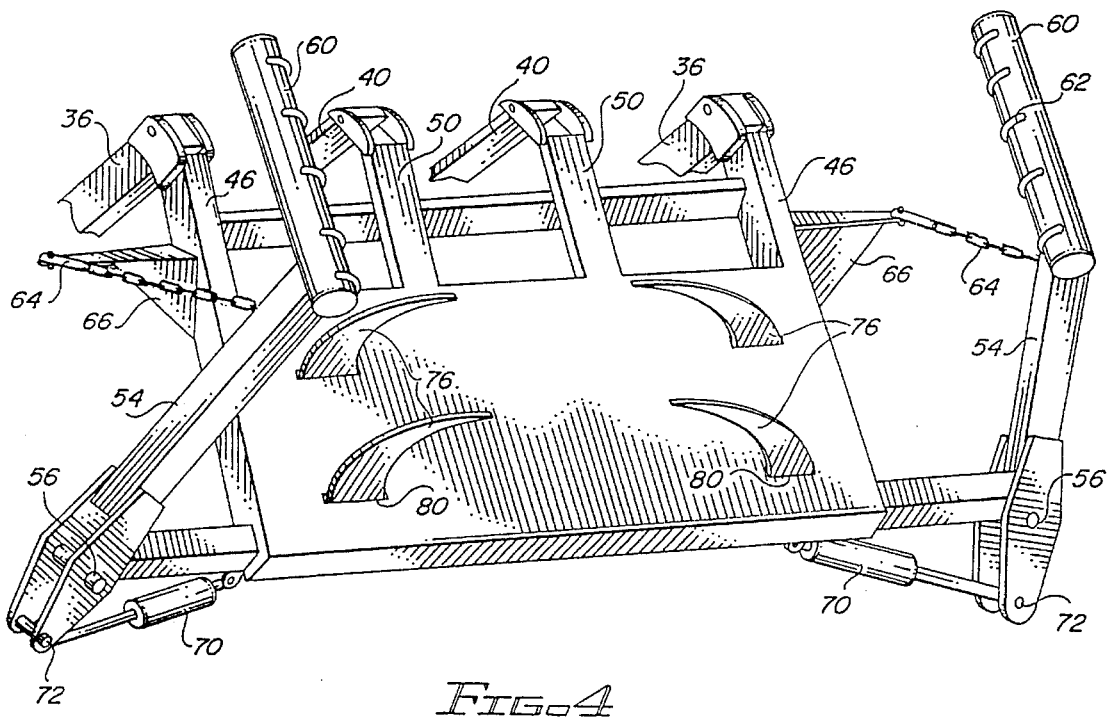
FIG. 4 is a perspective view of the bale loading mechanism of FIG. 3 showing the pick-up arms pivoted inwardly and showing bale-grasping grab hooks extended from the vertically positioned bale loading platform.
Figure 5:
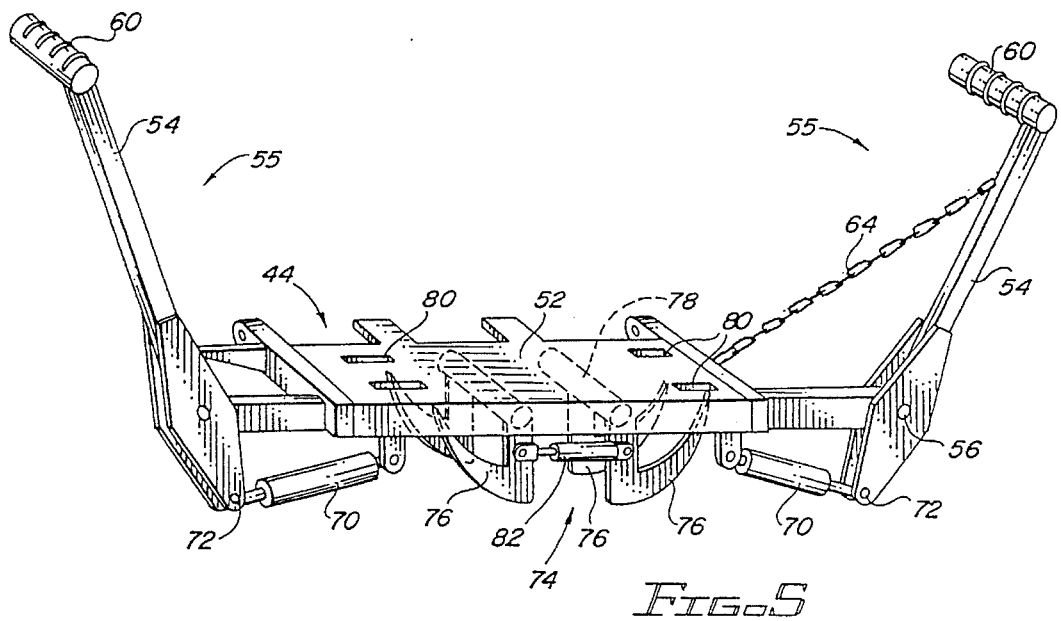
FIG. 5 is a perspective view of the bale loading mechanism of FIG. 4 showing the bale-grasping grab hooks in a retracted position.
Figure 6:
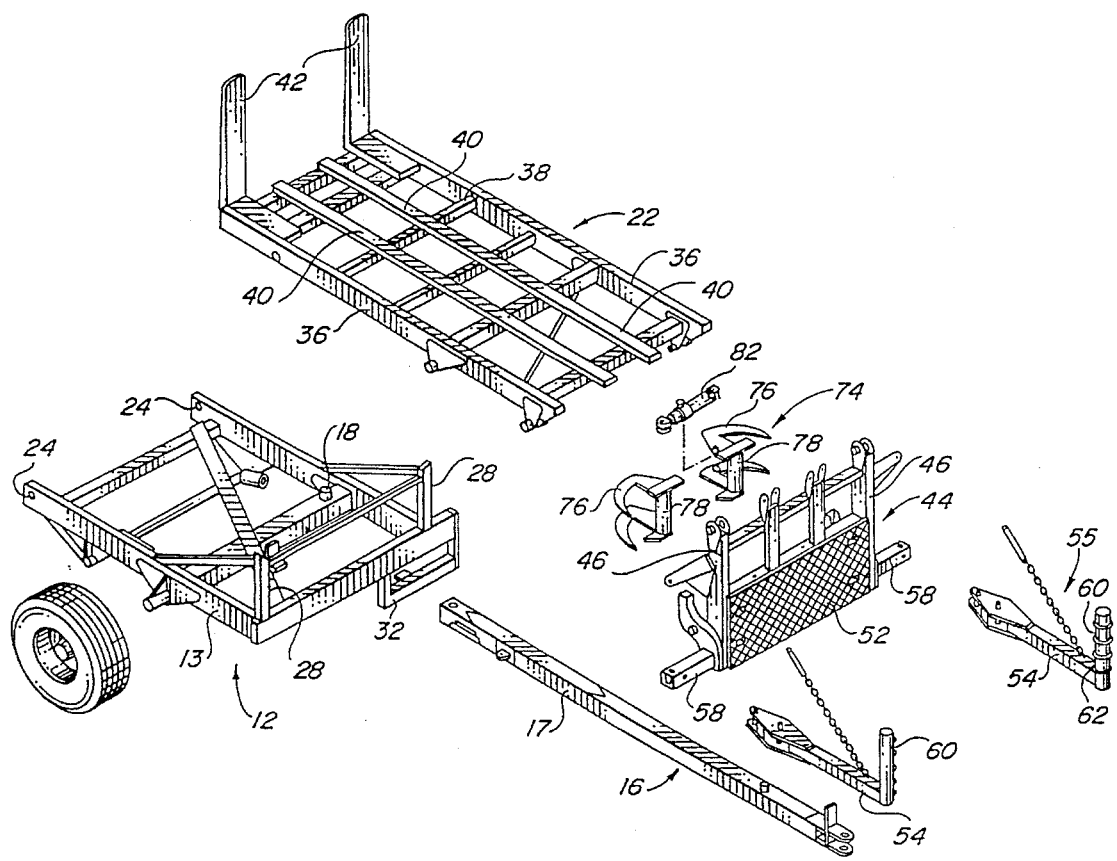
FIG. 6 is an exploded view showing the components of the bale handling apparatus of the present invention and showing the loader embodiment of FIGS. 2–5.
Figures 11A, 11B, 11C:
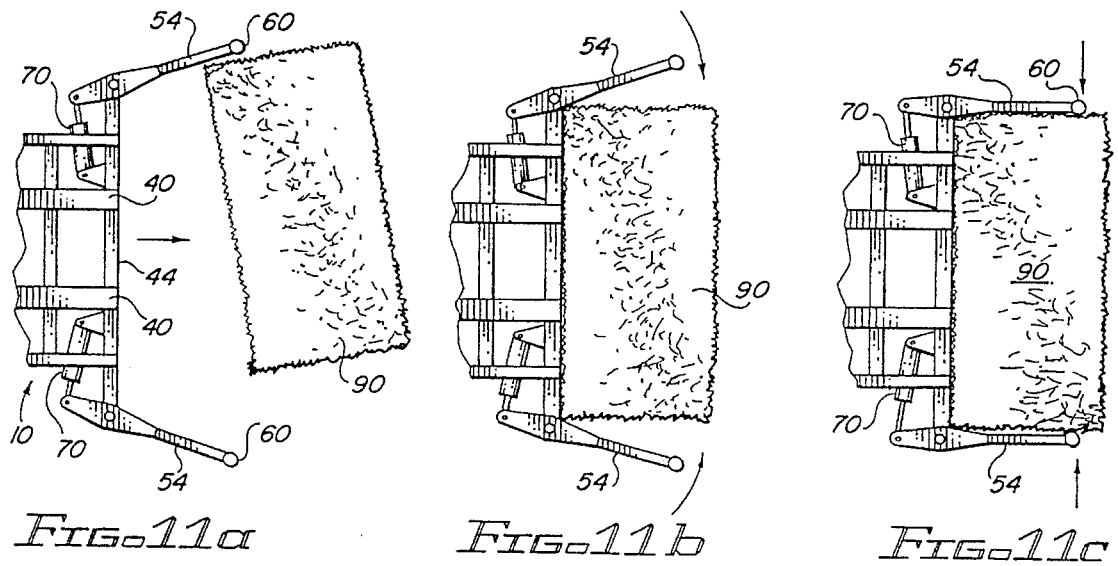
FIGS. 11a, 11b, and 11c are schematic plan views showing the manner in which the inclined pick-up arms are used to align and pick-up a large bale.
Figures 12, 13:
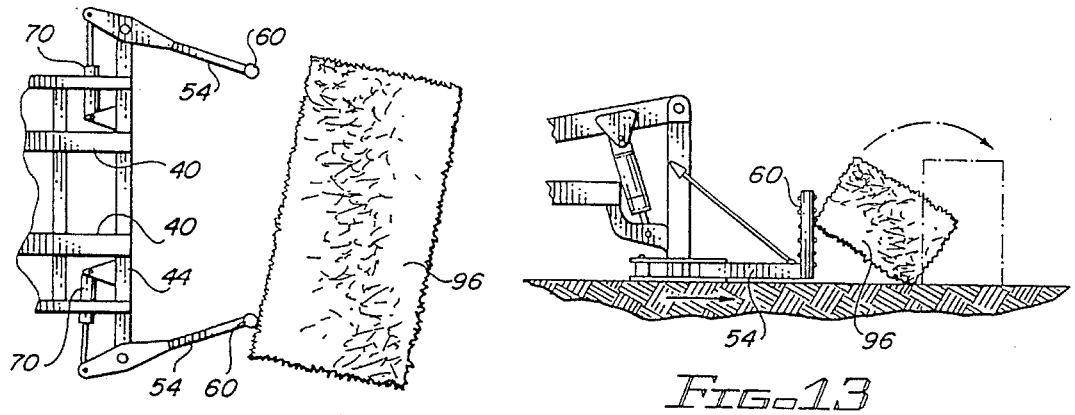
FIG. 13 is a side schematic view showing the use of the pick-up arms positioned as shown in FIG. 12a for tipping a bale with a rectangular cross section (Such as a 2×3 bale) into an upright position so that it can be properly loaded with the loading mechanism.

As shown in FIGS. 4 and 5, the pick-up arms 54 are pivoted inwardly and outwardly by means of hydraulic alignment cylinders 70 which engage pivot pins 72 at the rear ends of pick-up arms 54. Pick-up arms are pivotal between three positions, which are shown in FIGS. 11a, 11c, and 12. The arms are in an open position in FIG. 11a. In that position the pick-up arms extend outwardly from loading platform 44 at an outwardly inclined or open angle (an angle greater than 90 degrees) with respect to the loading platform. An intermediate or bale grasping position is shown in FIG. 11c. There, the arms are at approximately right angles to the loading platform to grasp a bale. A closed position shown in FIG. 12. There, the arms are positioned at an acute angle with respect to the loading platform.

The loading platform of FIG. 1 needs only the pick-up arms and the bale holding members to pick-up single large bales. This construction is particularly well-suited to pick up 4×4 bales.

Another embodiment of the invention is shown in FIGS. 2–6, wherein a grab hook assembly 74 is incorporated into the loading platform and positioned behind plate 52. The grab hook assembly includes two grab hook units, with each unit including a pair of curved grab hooks 76 mounted on a pivot axle 78 pivotally mounted to the back of the loading platform. The grab hooks are pivotal from a retracted position shown in FIG. 5 to an extended position shown in FIG. 4, wherein the grab hooks extend through openings 80 in back plate 52 and curve outwardly and inwardly with respect to the back plate. The grab hooks are rotated by means of a hydraulic grab hook cylinder 82 (shown in FIGS. 5 and 6).

Figure 8:
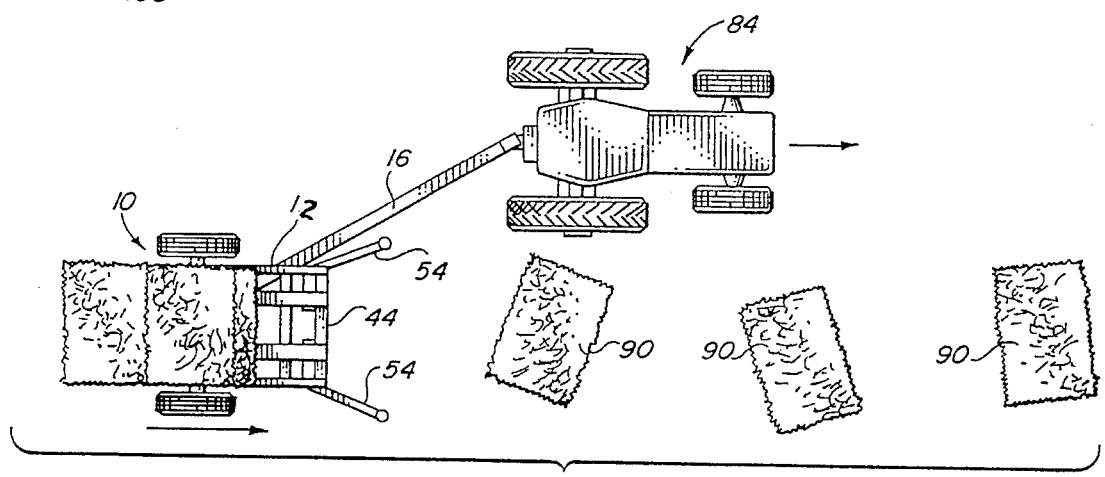
FIG. 8 is a schematic plan view showing the manner in which the trailer of the present invention is towed behind a tractor for picking up bales.

The operation of the above-described bale handling mechanism is shown in FIGS. 8–16. In FIG. 8, bale handler 10 is shown attached to a conventional tractor 84 by hitch mechanism 16. Pick-up arms 54 (which are alternatively called alignment arms) are shown in open position, positioned in an outwardly inclined angle with respect to loading platform 44. In this position, the bale handler is moved forwardly across the ground until it contacts and picks up bales 90 which are deposited at various locations in the field.

Referring to FIGS. 11a–11c, the operation of the pick-up arms is shown. In FIG. 11a, bale 90 is at a skewed and somewhat offset position with respect to loading platform 44. The bale engages the upper alignment arm and is guided inwardly and turned as the bale handler is moved forwardly into contact with the bale until the bale is properly oriented by the alignment arms, as shown in FIG. 11b. The alignment arms are then closed on the bale, as shown in FIG. 11c.

Figure 9:
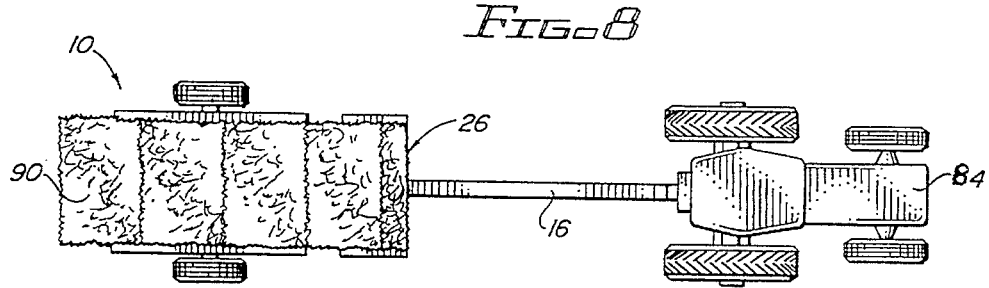
FIG. 9 is a schematic plan view showing a tractor pulling the trailer of the present invention for transporting the bales to a storage location, with the hitch being moved to a centered position so that the trailer follows the tractor.
Figure 10:
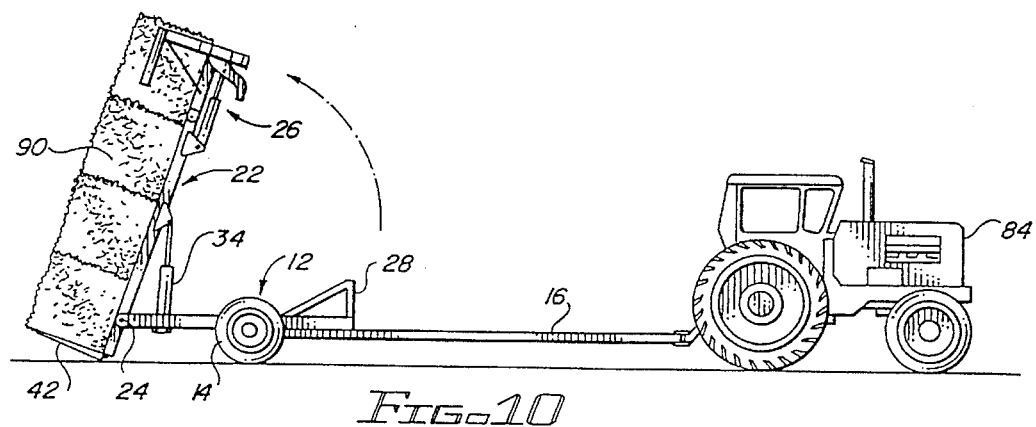
FIG. 10 is a schematic side elevational view showing the bale handling apparatus being pivoted in a rearward direction for stacking bales at a storage location or for unstacking the bales from a storage location for subsequent use.
Figure 14:
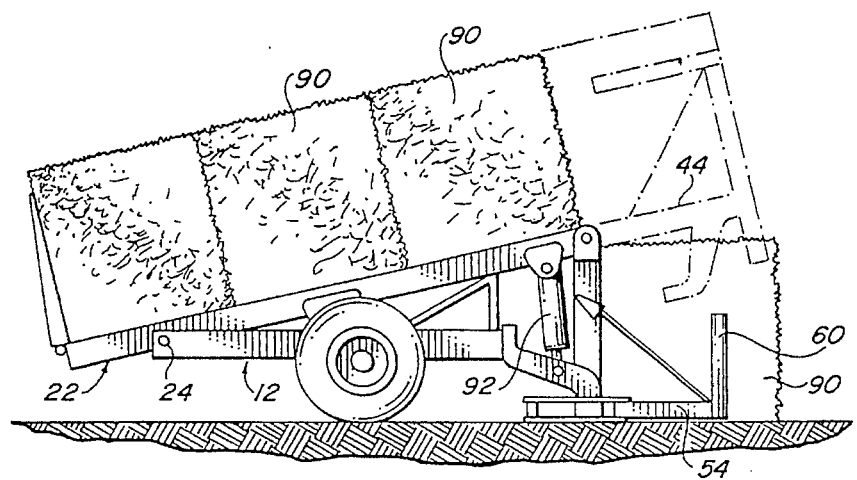
FIG. 14 is a side schematic view showing the embodiment of FIG. 1 used for loading large 4×4 bales on the inclined storage bed of the apparatus.

Referring to FIG. 14, the loading mechanism is then pivoted in an upwardly direction by means of hydraulic loader cylinders 92 (FIG. 2) which extend to force the loading platform to a position wherein the loading platform is slightly more inclined than the inclination of the bale receiving platform 22. The pick-up arms are then opened. The inclination of the loading platform induces the bales to start to slide off the loading platform onto the inclined bale accumulating platform. As shown in FIG. 14, three bales have already been loaded on the accumulating platform and a fourth bale is being picked up by the bale loading apparatus and is maintained in an elevated position for transportation. Referring to FIGS. 9 and 10, when the bale handler has been completely loaded, hitch cylinder 19 is retracted in order to move the hitch to a centered position so the bale handler is pulled directly behind the tractor. The tractor is then moved to a bale storage location, wherein the entire bed assembly is pivoted in a rearward direct by bed cylinders 34 to re-orient the bales in a vertical position. The pick-up arms are then opened and the tractor is driven away, pulling the forks 42 out from under the stack of bales and leaving the bales stacked for storage.

Figures 15A, 15B, 15C:
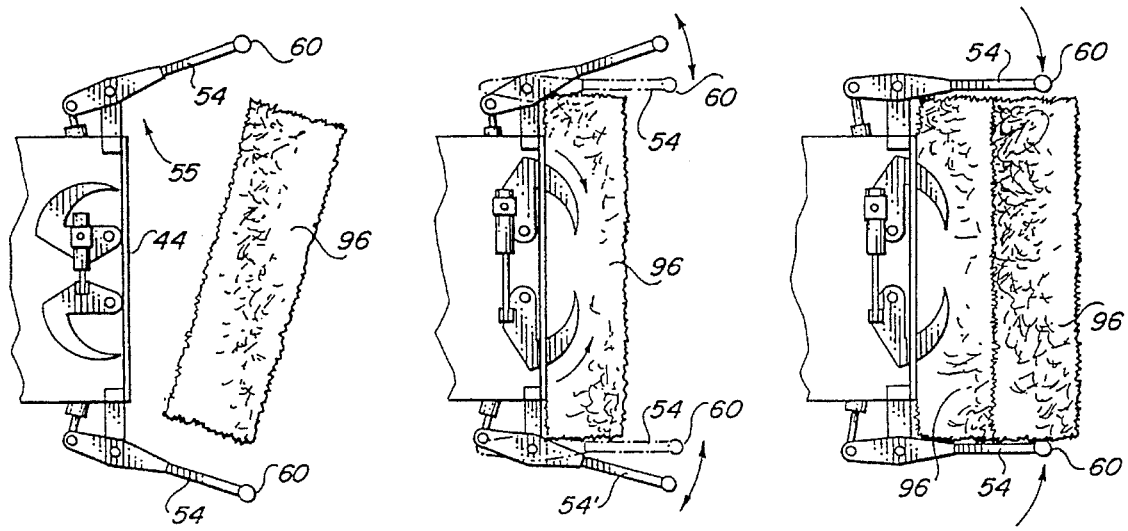
FIGS. 15a–15c are schematic plan views showing sequentially the use of the present invention with the bale grab hooks for loading a pair of 2×3 bales at once on the loading mechanism.

The operation of the grab hook embodiment of the present invention is shown in FIGS. 15a–15c. As shown in FIG. 15a, a bale is guided against the loading platform by alignment arms 54, as described previously. This bale, however, is a smaller bale, typically a 2×3 bale, having half the depth of the standard 4×4 bale, which is disclosed in FIGS. 11 and 14. To pick up the smaller 2×3 bales, the bales are first rotated if necessary (FIG. 13) so they stand on their narrow sides and the bale handler is directed against the bales. This is most easily accomplished with the pick-up arms pivoted inwardly from their clamping positions (as shown in FIG. 12). In that position, members 60 can orient and rotate the bales effectively.

After being manipulated and rotated, if necessary, the first bale 96 is guided by the pick-up arms 54 into contact with the loading platform. When the bale is in position, as shown in FIG. 15b, the pick-up arms are closed to clamp it in position, and the grab hooks are extended so as to penetrate and hold the bale against the loading platform. The alignment arms are then opened to the position shown in FIG. 15b and the bale handler is advanced until it engages the next bale 98 (FIG. 15c). Bale 98 is guided into position in a similar manner and pick-up arms 54 are closed on the bale to hold it in position. Bale holding members 60 engage the outer bale 98 and hold it in place.

Figure 16:
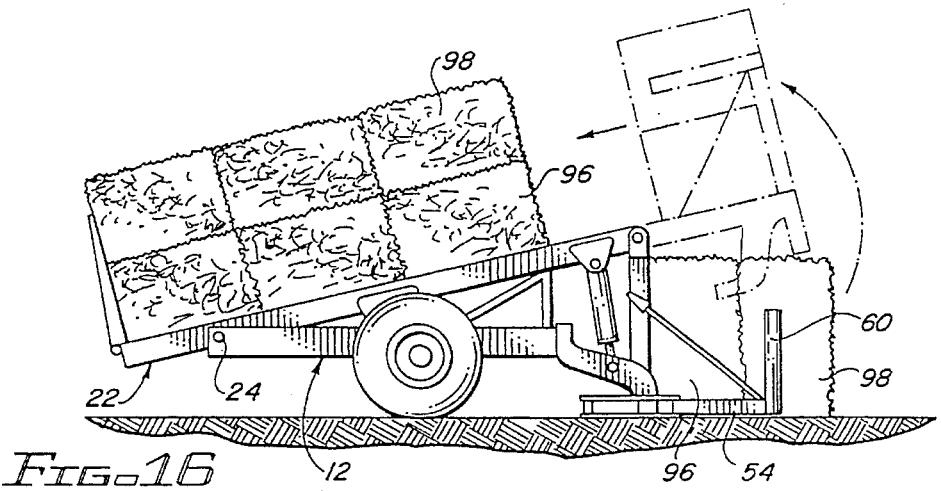
FIG. 16 is a side elevational view showing the manner in which the pairs of 2×3 bales are stacked by the loading mechanism of FIG. 15 on the inclined accumulating platform of the bale handling apparatus.

As shown in FIG. 16, the two bale bundle is then pivoted in an upward direction and deposited on the bed in a two bale stack in the same manner that single bales are loaded as shown in FIG. 14. The bales are then transported and stacked in the same manner shown in FIG. 10, with the grab hooks being retracted to permit the bales to be slid rearwardly onto the accumulating platform for stacking purposes.

Figure 17:
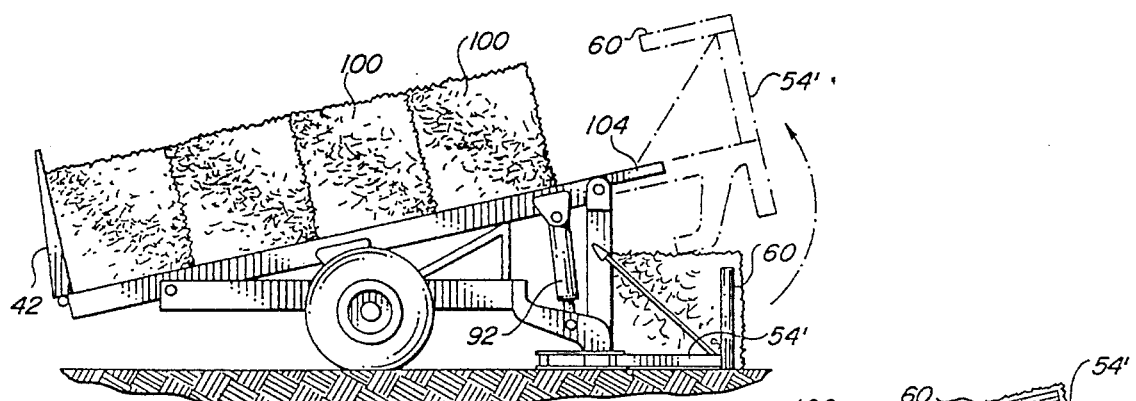
FIG. 17 is a schematic side elevational view of another embodiment of the present invention, wherein the loading apparatus is adapted to pick-up smaller 32×32 inch hay bales.

Still another embodiment of the present invention is shown in FIGS. 17–20. This embodiment is used for stacking smaller 32×32 inch bales. This unit uses slightly shorter pick-up arms 54' than the embodiments described above. As shown in FIG. 17, bales are picked up by the pick-up mechanism in the same way that large bales are picked up. The only difference is that the bales do not extend all the way to the junction between the loading platform and the front edge of the bed. As shown in FIG. 17, bale 100 has been grasped by the pick-up arms and four bales 100 are already positioned on the inclined bed.

Figure 18:
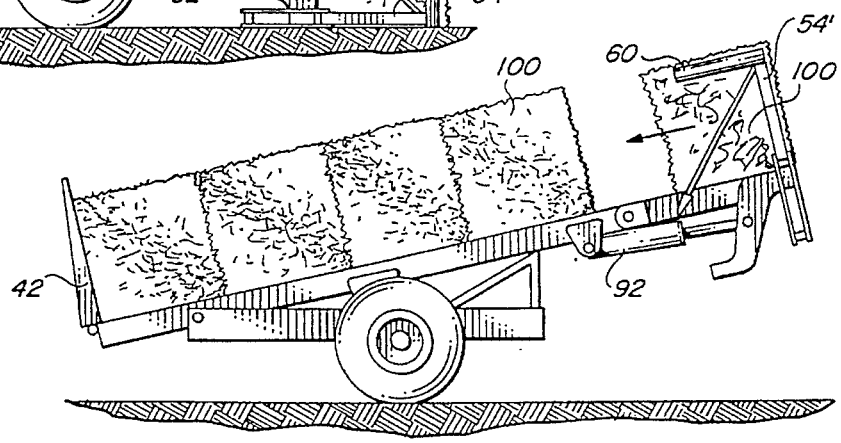
FIG. 18 is a schematic side elevational view of the embodiment shown in FIG. 17, with the loader pivoted in a raised position such that the bale slides rearwardly to the accumulating platform.
Figure 19:
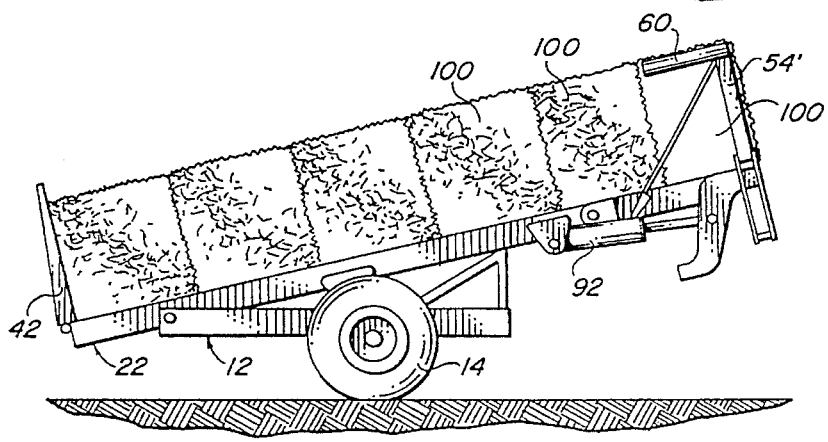
FIG. 19 is a schematic side elevational view showing five bales loaded on the platform of FIG. 17 and a sixth bale being picked up by the apparatus.
Figure 20:
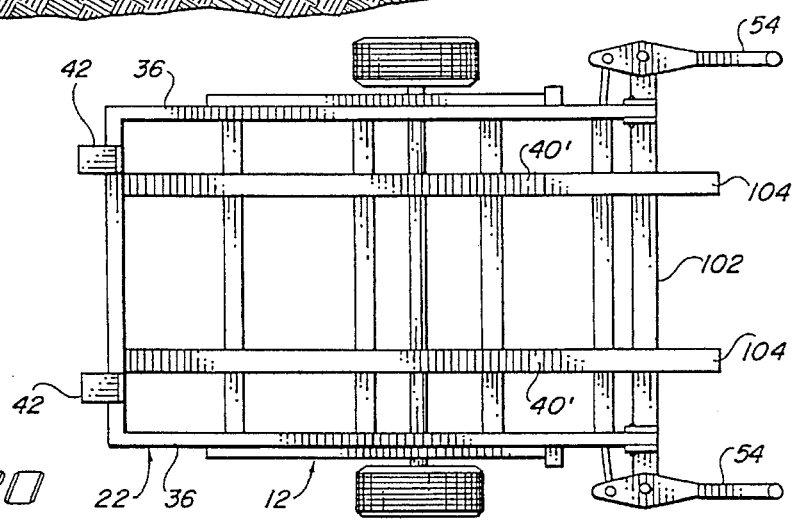
FIG. 20 is a plan view of the bale handling apparatus of FIGS. 17–19.

As shown in FIG. 20, which is a plan view of the bale handler, the longitudinal inner rails 40' extend forwardly beyond the front edge 102, such that extended portions 104 project forwardly from the edge of the bed. As shown in FIG. 18, when pick-up arms are opened, bale 100 slides rearwardly and ultimately rests on extension members 104. This permits the loading mechanism to be lowered downwardly so that it can pick up a final bale. The loading mechanism is then pivoted upwardly and carries the final bale at the front end of the bale handler (as shown in FIG. 19). With this embodiment, the bale handler can carry a total of six 32×32 bales.

Another embodiment of the present invention is shown in FIGS. 21–26. In this embodiment, bale handler 160 is similar to the design of the bale handler shown in FIG. 17, with the exception that the loader design is modified so that it is particularly well adapted for stacking one-half ton square bales (also called 32×32 bales) in two layers, much in the manner that 2×3 bales are stacked two deep as shown in FIGS. 15 and 16.

Figure 21:
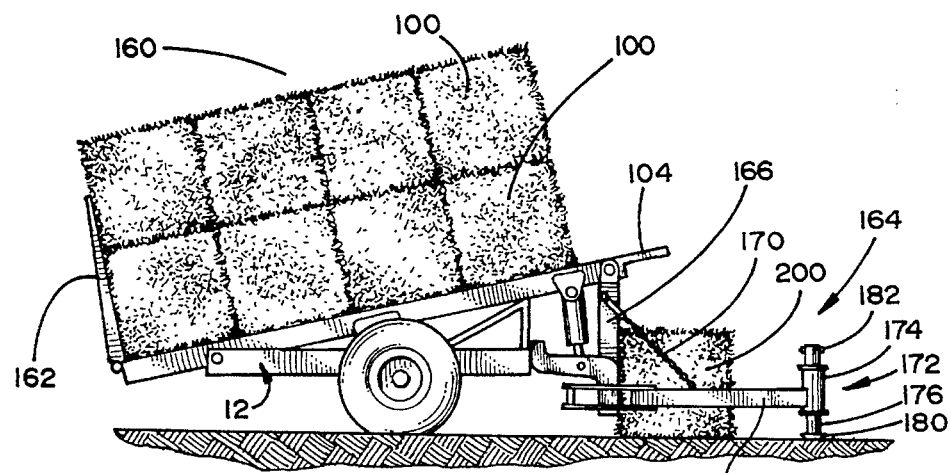
FIG. 21 is a schematic side elevational view of another embodiment of the present invention, wherein the loading apparatus is adapted to pick up smaller one-half ton or 32×32 inch hay bales in two layer stacks.

In most respects, bale handler 160 is substantially the same as the other embodiments of the invention, and like numerals are used to describe like parts. Like the other embodiments, bale handler 160 has a normally rearwardly inclined bale accumulating platform or bed 22 pivotally mounted on a wheeled trailer 12. The construction of the bed and trailer are substantially as shown in FIG. 20, with a couple of exceptions. Instead of employing the shorter forks 42 at the rear of the trailer, loader 160 has upwardly extending forks 162 which extend to support a two bale stack, instead of the one bale height of forks 42. The front end of the trailer does have forwardly extending extension members 104, as in FIG. 20, for supporting one of the columns of bales on the front of the accumulating platform. In FIG. 21, the platform has been loaded with four stacks of half-ton square bales 100, and the loading apparatus is in the process of picking up the next stack of bales. Loading mechanism 164 is of substantially the same design as the loading mechanisms described above, with some improvements. Like the other loading mechanisms, loading mechanism 164 includes a downwardly extending loading platform 166 with substantially the same features as loading platform 44 of FIGS. 3 and 4. Loading platform 166 incorporates grab hooks of the same type shown in FIGS. 3 and 4 and illustrated in FIGS. 15a–15c, and the grab hooks work in substantially the same manner as described above.

Alignment arms 168 extend outwardly from each side of loading platform 166 and are supported by support struts or chains 170. Alignment arms 168 are positioned somewhat above the ground, so when the alignment arms are pivoted inwardly, they squeeze the bale at a raised position relative to the bottom of the bale, thus providing a secure grip on the bale. Alignment arms 168 are somewhat longer than the alignment arms 54 shown in FIG. 20, because these alignment arms have to extend out far enough to grasp two bales instead of the one bale in the apparatus of FIG. 20. In addition, alignment arms 168 have a unique floating alignment tube mechanism 172 (also called a floating foot) at the outer end of arms 168 instead of the fixed position bale grasping members 60 shown in the other embodiments. The floating alignment tube mechanism 172 provides an important advantage for the present invention.

Figure 26:
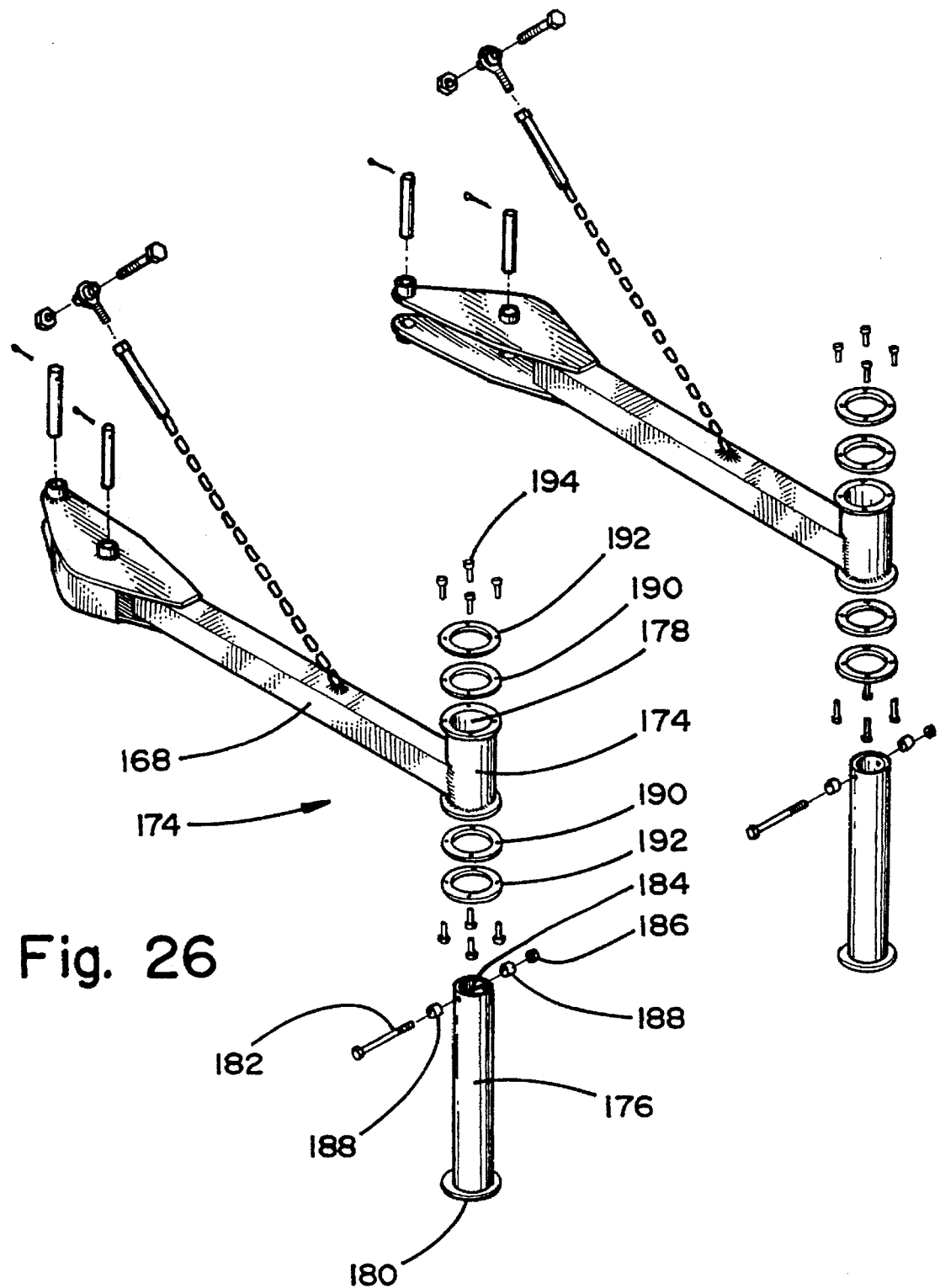
FIG. 26 is an exploded perspective view of the pick up arms of the embodiment of FIG. 21.

Referring to FIG. 26, floating alignment tube mechanism 172 comprises a vertical sleeve 174 fixed at the outer end of alignment arm 168. An alignment tube member 176 in the form of a tubular sliding foot member fits in an interior opening 178 of sleeve 174 and extends therethrough. A dish shaped base 180 forms the bottom of member 176 and prevents the lower end of the member from fitting all the way through the opening in sleeve 174. The upper end of tubular member 176 is locked on the top of sleeve 174 by means of a pin or bolt 182 that extends through an opening 184 in the upper end of the tube. Pin 182 is held in place by a nut 186. Bushings 188 separate the head of the pin or bolt 182 and the nut 186 from the sleeve. The upper and lower ends of sleeve 174 are fitted with alignment bearings 190 on the upper and lower ends of the sleeve for slidably guiding tubular foot 176. The bearings are held in place by bearing retainers 192, which are in turn mounted on flanges at the upper and lower ends of the sleeve by bolts 194.

The purpose and manner in which the sliding alignment tube or foot works is shown in the drawings. Tubular mamber 176 rides freely in sleeve 174 and is free to float upwardly and downwardly between pin 182 and the dish shaped base 180. Base 180 is positioned adjacent the ground when the alignment arms are lowered.

The purpose of the sliding tubular member or foot is illustrated in connection with the operation of this device. As shown in FIG. 21, a first bale 200 is picked up by clamping the bale between alignment arms 168 in the manner described above with respect to other embodiments. When bale 200 is positioned against loading platform 166, the alignment arms are pivoted inwardly to grasp the ends of the bale and the grab hooks are extended to grip the back of the bale, as previously described.

Figure 22:
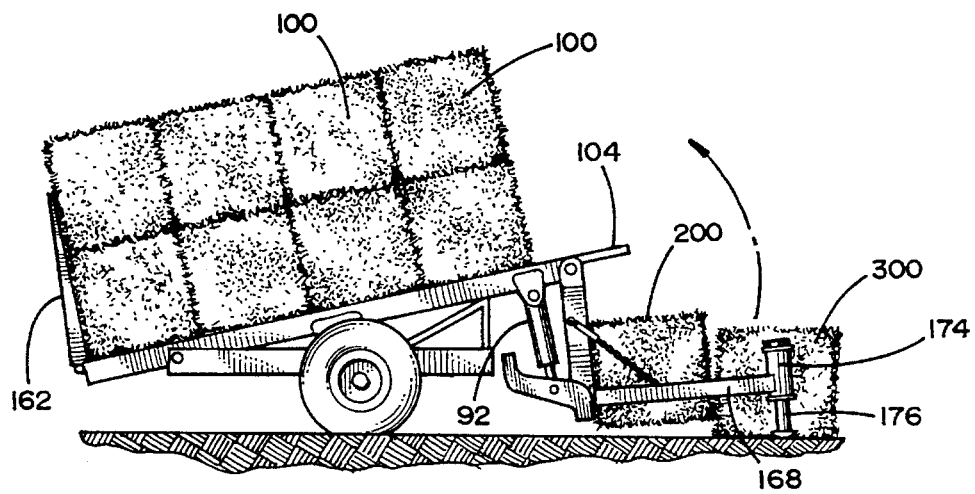
FIG. 22 is a schematic side elevational view of the embodiment of FIG. 21, showing the loader in the process of picking up a second bale.

The next step involves pivotally raising the pick up mechanism so that bale 200 is 8 to 12 inches off the ground. This position is shown in FIG. 22. With the grab hooks inserted into the bale, the alignment arms can then be pivoted outwardly to grasp another bale in the position of bale 300 in FIG. 22. As shown in FIG. 22, tube 176 slides downwardly in sleeve 174 when the alignment arms 168 are raised. This leaves mamber 176 roughly centered on the end of bale 300, even though the alignment arms are pivoted somewhat upwardly. With the alignment arms in the positions shown in FIG. 22, the alignment arms are pivoted inwardly so that they grasp the ends of bale 300.

Figure 23:
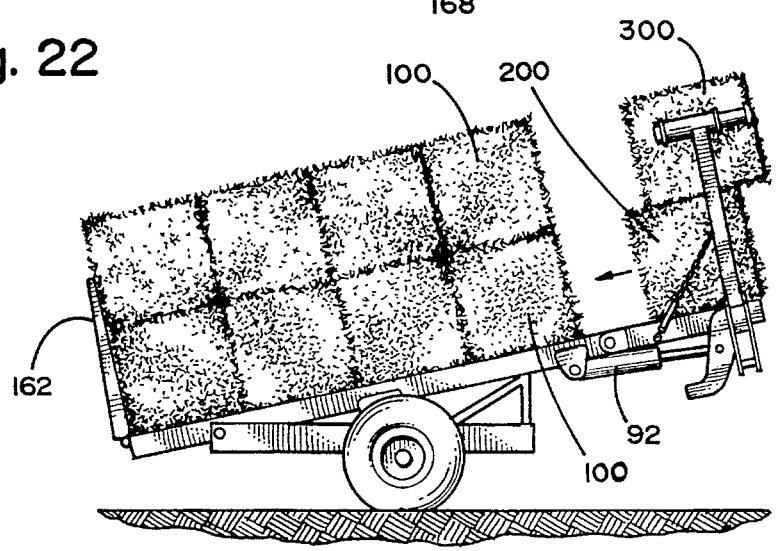
FIG. 23 is a schematic side elevational view showing the embodiment of FIG. 21 with the loader containing two bales in staggered relationship, with the loader pivoted in a raised position.
Figure 24:
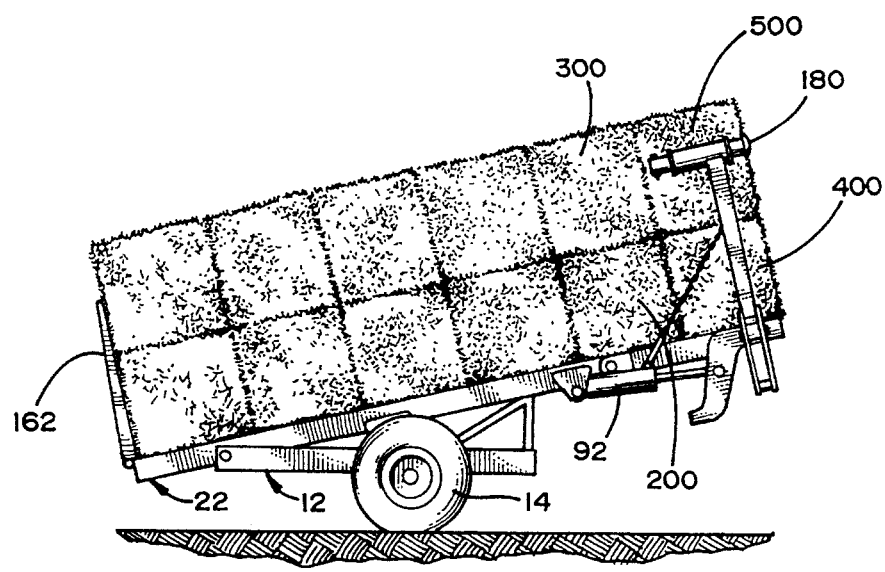
FIG. 24 is a schematic side elevational view showing the embodiment of FIG. 21 with 10 bales loaded on the platform and two additional bales supported by the pick up apparatus.
Figure 25:
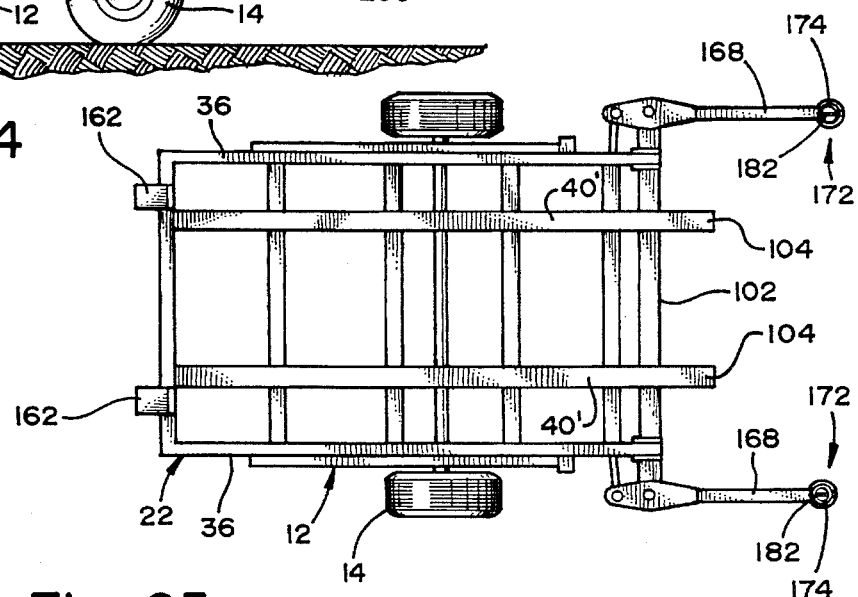
FIG. 25 is a plan view of the bale handling apparatus of FIG. 21.

The next step in the loading process is shown in FIG. 23. The loading platform is pivoted to its raised position, placing bales 200 and 300 in the position shown in FIG. 23. As shown, bale 300 is "stair-stepped" or staggered forwardly from bale 200 (in the direction of trailer movement) by about 8 to 12 inches, because of the raising procedure undertaken before picking up bale 300. When the bales are in the position of FIG. 23, they are released and slide backwardly until they contact bales 100. The staggered position of bales 200 and 300 is important in order to maintain the center of gravity of the bales at a forward position so that they bales do not roll or tip over rearwardly as they slide to the rear. By providing an 8 to 12 inch stagger between the lower and upper bale, this problem is avoided.

The final position of the bales is shown in FIG. 18 after a full load of bales has been loaded on the accumulating platform. A final two bales 400 and 500 are supported by the lift mechanism itself.

As in previous embodiments, the loading platform is pivoted between its raised and lowered positions by a hydraulic drive 92. Other element numbered in these figures that are not discussed in connection with this embodiment are the same as the like numbered elements discussed with respect to previous embodiments.

The floating alignment tube or foot of the present invention makes it possible to grip securely the center of each bale, even though the alignment arms are raised or lowered with respect to the ground, while at the same time permitting the alignment arms to pivot downwardly close to the ground.

The system employs improved hydraulic circuitry that makes it possible for a tractor operator to initiate a complex sequence of pick-up actions by actuation of a single control valve in the tractor.

Figure 7:
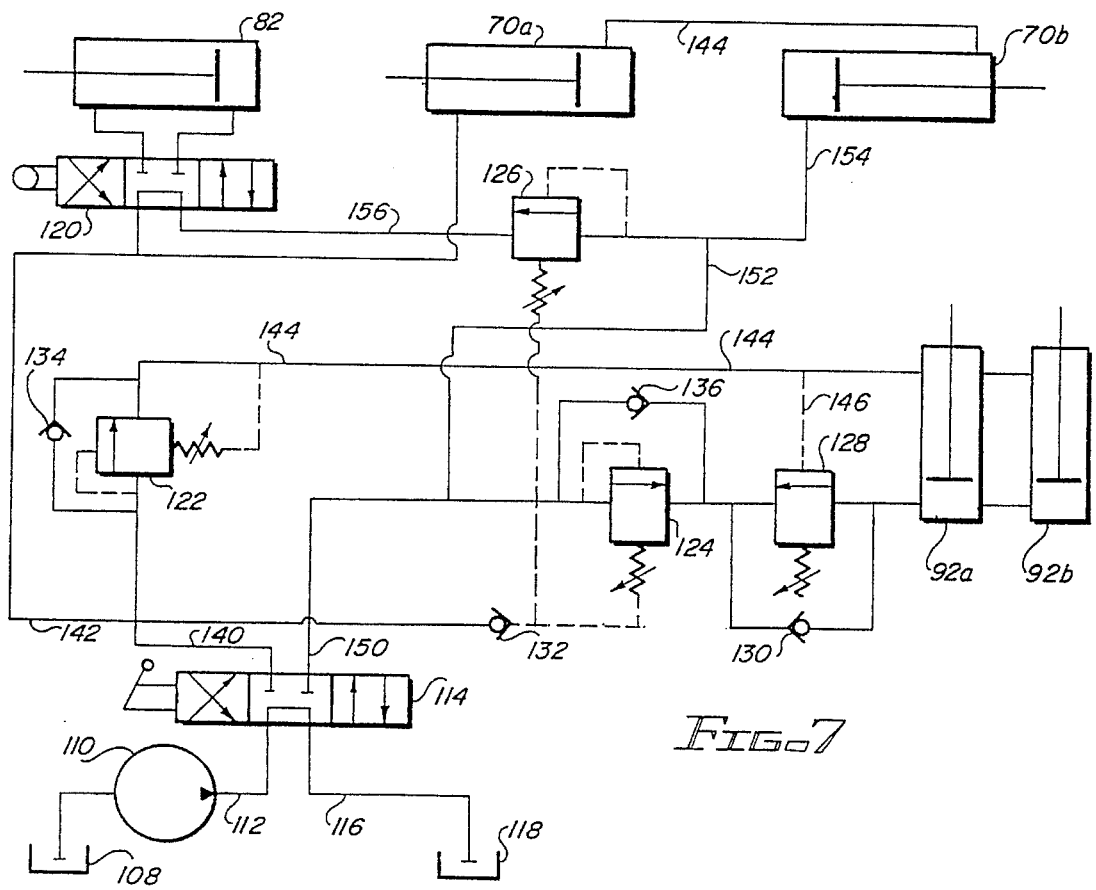
FIG. 7 is a hydraulic schematic diagram of the hydraulic circuitry of the present invention.

The hydraulic circuitry for the present invention is shown in FIG. 7. Pressurized hydraulic fluid is provided from a reservoir 108 by a pump 110 through a conduit 112 to a three-position hydraulic control valve 114, which is mounted in the tractor and controlled by the tractor operator. A return line 116 leads to a reservoir 118 from the valve mechanism.

Valve 120 is a control valve which is mechanically actuated by the movement of the loading platform. The valve is moved to the left by the loader when it is almost down and is actuated to the right by the loader when the loader is raised to a horizontal position.

Valves 122, 124 and 126 are sequence valves. Valve 128 is a counter-balance valve. Valves 130, 132, 134, and 136 are check valves.

The valves control hydraulic pressure to a number of hydraulic cylinders. Hydraulic cylinders 70a and 70b are alignment cylinders, which close the alignment or pick-up arms when expanded and open the arms when collapsed or retracted. Hydraulic cylinder 82 is the grab hook cylinder, which engages the hooks when expanded and disengages the hooks when retracted. Hydraulic cylinders 92a and 92b are the loader cylinders, which raise the loading assembly when expanded and lower the loading assembly when retracted.

To explain the operation of the hydraulic circuitry, the loader is moved to the vertical bale loading position by the tractor operator when he shifts control valve 114 to the left. This forces hydraulic fluid through conduit 140 to conduit 142 and then to the left hand end of one of the cylinders 70a. This in turn forces fluid through conduit 144 into the right hand end of the other cylinder 70b, causing both cylinders to collapse at the same rate. The collapse of the alignment arm cylinders 70 causes the alignment arms to open in preparation for grasping a new bale of hay. After the hydraulic fluid causes a collapse of cylinders 70, the fluid is conveyed by conduit 140 through sequence valve 122, which in turn conveys fluid through conduit 144 to pilot line 146 of sequence valve 128. Pressurizing the pilot line on valve 128 causes it to allow fluid to flow through valve 128 and allows cylinders 92 to collapse. The collapse of cylinders 92 is caused by the hydraulic fluid conveyed through conduit 144 to the upper ends of the cylinders. The collapse of cylinders 92 causes a sequential lowering of the loading platform after the pick-up arms have been opened. Thus, the alignment arms are open and the loader is down to start the loading of a bale.

As the loading platform reaches its lowered position, control valve 120 is shifted to the left by the mechanical lowering of the loading platform. This collapses the grab hook cylinder and retracts the grab hooks.

At this point, the loading mechanism is in position to engage a bale on the ground. When the bale has been engaged and is in proper position against the loading platform, the tractor operator shifts control valve 114 to the right position. This directs hydraulic fluid through conduit 150 and then conduit 152 to conduit 154 leading to the left hand end of the right alignment arm cylinder 70b. This causes the cylinder to expand, which in turn causes hydraulic fluid to flow through conduit 144 into the left alignment arm cylinder 70a and causes that alignment arm cylinder to expand at the same rate. The expansion of the alignment or pick-up arm cylinders causes the alignment arms to clamp inwardly and engage a bale of hay positioned against the loading apparatus. Next, if the pressure setting on valve 126 is less than the pressure setting on valve 124 (which is the case), the hydraulic fluid then passes through sequence valve 126 by conduit 156 and causes grab hook cylinder 82 to expand, extending the grab hooks into engaging position with a bale. Once cylinder 82 is expanded, fluid will then be forced to bypass valve 124, allowing cylinders 92 to expand. Once the loader cylinders 92 cause the loader to pivot upwardly to a horizontal position, control valve 120 is shifted to the right by the action of the loading platform and this allows hydraulic fluid to collapse cylinder 82 without changing the position of control valve 114. Thus, when the loading platform is raised, the grab hooks are automatically retracted to release the bale so that it can slide rearwardly on the loading platform. When cylinders 92 are fully extended, the alignment arms will be closed and the bale holding grab hooks will be disengaged.

The operator now shifts control valve 114 to the left, the alignment arm will open first allowing the bale to slide onto the cumulating platform. Then the loader will be lowered to complete the cycle.

It should be understood that the foregoing are merely exemplary embodiments of the preferred practice of the present invention and the various changes and modifications may be made in the details and arrangements of the elements disclosed herein without departing from the spirit and scope of the present invention, which is defined in the appended claims.

I claim:

1. An improved bale loading mechanism for a large bale handling apparatus that comprises an offset wheeled trailer pulled by a tractor, a bale accumulating platform on the trailer, and a bale loading mechanism at the front of the apparatus that picks up and deposits the bales on the accumulating platform as the apparatus is pulled over a field, the bale loading mechanism comprising:

a loading platform pivotally mounted at an inner end thereof to the front of the accumulating platform for movement between a lowered position, wherein the loading platform extends downwardly toward the ground, and a raised position wherein the loading platform extends forwardly from the front of the bale accumulating platform at an upwardly inclined angle;

a pair of pick-up arms pivotally mounted on laterally opposite sides of the loading platform and extending outwardly therefrom for movement in a plane generally perpendicular to the plane of the loading platform, the pick-up arms being pivotal between a gripping position, wherein the arms are pivoted inwardly in position to grip the ends of bales positioned between the arms, and an open position, wherein the arms are pivoted in an outwardly inclined position with respect to the loading platform, such that the arms in their open position serve as inclined alignment members that engage a bale that is out of orientation or alignment with the loading platform in its lowered position and move the bale into orientation and alignment with the loading platform as the apparatus is pushed forwardly against the bale;

gripping members on outer portions of the pick-up arms and extending from the pick-up arms so as to engage and hold bales securely when they are clamped between the pick-up arms, the pick-up arms and gripping members serving to hold the bales and restrain them from falling off the bale loading mechanism as the loading platform is moved to its raised position, the gripping members comprising sleeves that are directed upwardly from outer ends of the pick-up arms when the loading platform is in its lowered position, the gripping members further comprising elongated foot members slidably mounted for up and down movement in the sleeves between upper and lower movement limiters on the foot members, the slidable foot members permitting the gripping members to grasp a bale in a centered location vertically even if the loading platforms raised somewhat from its lowered position; and drive means for raising and lowering the loading platform and opening and closing the pick-up arms.

2. A bale loading mechanism according to claim 1 and further comprising grab hook means for holding bales to the loading platform, the grab hook means comprising at least one hook pivotally mounted to the loading platform for movement between a retracted position, wherein the hook does not interfere with the movement of a bale on the loading platform, and an extended position, wherein the hook extends outwardly from a front face of the loading platform, such that the hook penetrates a bale positioned against the loading platform and restrains it from falling off the loading platform.

3. A bale loading mechanism according to claim 2 wherein the grab hook means comprise at least two curved hooks mounted in laterally opposed positions behind the loading platform and extendable through the platform through openings therein, the hooks being pivotally mounted for movement about a vertical axis when the loading platform is in its lowered position, the hooks being retracted behind the loading platform when in their retracted positions and being extended through the openings in the loading platform when in their extended positions, the hooks penetrating and holding a bale against the loading platform when the hooks are extended.

4. A bale loading mechanism according to claim 2 wherein the grab hook means are adapted to hold a first bale to the loading platform while the bale handling mechanism is maneuvered to pick up a second bale, the pick-up arms extending outwardly from the loading platform a sufficient distance to engage and pick up a second bale positioned in abutment with the first bale, the sliding feet in the gripping members on outer portions of the pick-up arms causing the gripping members to engage the second bale in a generally vertically centered location on the ends of the bale even if the pick-up arms are raised somewhat, whereby the second bale can be staggered forwardly relative to the first bale when the loading platform and pick-up arms are raised, increasing the stability of the first and second stacked bales when they slide rearwardly on the accumulating platform.

5. A bale loading mechanism according to claim 4 wherein the apparatus is adapted to pick up half ton square bales two at a time and stack them in two layers on the accumulating platform.

6. A bale loading mechanism according to claim 5 wherein the loading platform is substantially longer than the side dimension of the bale such that there is a space of predetermined size between the top of a bale on the ground and an upper end of the loading platform, the accumulating platform including rail extensions that extend forwardly from the front of the accumulating platform by a distance such that an extra bale can rest on the rail extensions after the accumulating platform has been filled and the loading platform can still be pivoted downwardly to its lowered position to pick up a final bale, which is held by the bale loading mechanism to completely fill the bale handling apparatus.

7. A bale loading mechanism according to claim 4 wherein the movement of the loading platform, grab hook means, and pick-up arms is accomplished by fluid drive cylinders, the drive cylinders being controlled by a hydraulic control circuit that is formed such that an operator can control all cylinders by a single operating valve, the circuit causing the grab hooks to open when the loading platform approaches its raised position and causing a sequential opening of the pick-up arms and lowering of the loading platform when the operating valve is moved to a down position, the circuit sequentially causing the pick-up arms to close, the grab hooks to extend, and the loading platform to be pivoted to its raised position when the operating valve is moved to an up position.

* * * * *